United States Patent
Muzaffar et al.

(10) Patent No.: US 10,951,596 B2
(45) Date of Patent: Mar. 16, 2021

(54) METHOD FOR SECURE DEVICE-TO-DEVICE COMMUNICATION USING MULTILAYERED CYPHERS

(71) Applicant: Khalifa University of Science and Technology, Abu Dhabi (AE)

(72) Inventors: Shahzad Muzaffar, Abu Dhabi (AE); Owais Talaat Waheed, Abu Dhabi (AE); Ibrahim Elfadel, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 204 days.

(21) Appl. No.: 16/047,375

(22) Filed: Jul. 27, 2018

(65) Prior Publication Data
US 2020/0036690 A1   Jan. 30, 2020

(51) Int. Cl.
*H04L 29/06* (2006.01)
*H04L 9/06* (2006.01)
*H04L 9/08* (2006.01)
*G06F 21/64* (2013.01)

(52) U.S. Cl.
CPC .......... *H04L 63/0478* (2013.01); *G06F 21/64* (2013.01); *H04L 9/0618* (2013.01); *H04L 9/0894* (2013.01)

(58) Field of Classification Search
CPC . H04L 63/0478; H04L 9/0618; H04L 9/0894; G06F 21/64
See application file for complete search history.

(56) References Cited

U.S. PATENT DOCUMENTS

| | | |
|---|---|---|
| 5,282,200 A | 1/1994 | Dempsey et al. |
| 6,366,223 B1 | 4/2002 | Lee et al. |
| 6,970,435 B1 | 11/2005 | Buchanan et al. |

(Continued)

OTHER PUBLICATIONS

NPL: "Single-clock-cycle, Multilayer Encryption Algorithm for Single-channel IoT Communications," 153-158 pages, 2017. (Year: 2017).*

(Continued)

*Primary Examiner* — Yonas A Bayou
(74) *Attorney, Agent, or Firm* — Withrow & Terranova, P.L.L.C.

(57) ABSTRACT

A method for secure device-to-device communication using multilayered ciphers is provided. A selected cipher is employed to generate a pair of encryption/decryption keystreams for enabling multilayered encryption/decryption on a pulsed-index communication (PIC) packet(s). In examples discussed herein, a first layer encryption/decryption is performed by encrypting/decrypting a PIC data(s) (PD(s)) in the PIC packet(s) based on a first of the pair of encryption/decryption keystreams. In addition, a second layer encryption/decryption is performed by encrypting/decrypting selected control information (e.g., information related to encoding/decoding the PD(s)) in the PIC packet(s) based on a second of the pair of encryption/decryption keystreams. By performing multilayered encryption/decryption on the PIC packet(s), it is possible to defend against malicious attacks in single-channel device-to-device communication without compromising such key performance indicators (KPIs) as complexity, latency, power consumption, and footprint.

20 Claims, 7 Drawing Sheets

(56) References Cited

U.S. PATENT DOCUMENTS

| | | | |
|---|---|---|---|
| 10,134,402 B2* | 11/2018 | Zhou | G10L 19/0204 |
| 10,832,688 B2* | 11/2020 | Zhou | G10L 19/0204 |
| 2003/0219004 A1 | 11/2003 | Liu et al. | |
| 2004/0095020 A1 | 5/2004 | Kemahan et al. | |
| 2004/0095264 A1 | 5/2004 | Thomas | |
| 2004/0261001 A1 | 12/2004 | Chang et al. | |
| 2007/0092029 A1 | 4/2007 | Yu et al. | |
| 2008/0212606 A1 | 9/2008 | Batty | |
| 2009/0281811 A1* | 11/2009 | Oshikiri | G10L 19/0208 704/500 |
| 2010/0153723 A1 | 6/2010 | Artus | |
| 2010/0329186 A1 | 12/2010 | Lim et al. | |
| 2013/0290003 A1* | 10/2013 | Choo | G10L 19/20 704/500 |
| 2014/0214411 A1* | 7/2014 | Daimou | G10L 19/0212 704/206 |
| 2014/0219459 A1* | 8/2014 | Daniel | G10L 19/008 381/23 |
| 2014/0355768 A1* | 12/2014 | Sen | G10L 19/008 381/23 |
| 2015/0162011 A1* | 6/2015 | Qi | G10L 19/0204 704/500 |
| 2015/0206541 A1* | 7/2015 | Qi | G10L 19/032 704/229 |
| 2016/0049157 A1* | 2/2016 | Mittal | G10L 19/038 704/500 |
| 2017/0223356 A1* | 8/2017 | Sung | H03M 13/156 |
| 2017/0234970 A1 | 8/2017 | Harvey | |
| 2017/0309287 A1* | 10/2017 | Lee | G10L 19/26 |
| 2018/0131505 A1 | 5/2018 | Muzaffar et al. | |
| 2019/0190525 A1 | 6/2019 | Fredenburg et al. | |

OTHER PUBLICATIONS

Muzaffar, S., et al., "A Pulsed-Index Technique for Single-Channel, Low Power, Dynamic Signaling," 2015 Design, Automation & Test in Europe Conference & Exhibition (Date), Mar. 9-13, 2015, Grenoble, France, pp. 1485-1490.

Muzaffar, S., et al., "Timing and Robustness Analysis of Pulsed-Index Protocols for Single-Channel IoT Communications," 2015 IFIP/IEEE International Conference on Very Large Scale Integration (VLSI-SoC), Oct. 5-7, 2015, Daejeon, South Korea, pp. 225-230.

Muzaffar, S., et al., "Power Management of Pulsed-Index Communication Protocols," 2015 33rd IEEE International Conference on Computer Design (ICCD), Oct. 18-21, 2015, New York, New York, USA, pp. 375-378.

Muzaffar, S., et al., "Single-clock-cycle, Multilayer Encryption Algorithm for Single-channel IoT Communications," 2017 IEEE Conference on Dependable and Secure Computing, Aug. 7-10, 2017, Taipei, Taiwan, pp. 153-158.

Du, Qingjin, et al., "A 2.5 Gb/s, Low Power Clock and Data Recovery Circuit," Canadian Conference on Electrical and Computer Engineering, Apr. 2007, IEEE, pp. 526-529.

Loh, Matthew, et al., "All-Digital CDR for High-Density, High-Speed I/O," IEEE Symposium on VLSI Circuits, Jun. 2010, 2 pages.

Loh, Matthew, et al., "A 3×9 Gb/s Shared, All-Digital CDR for High-Speed, High-Density I/O," Journal of Solid-State Circuits, vol. 47, Issue 3, Mar. 2012, IEEE, pp. 641-651.

Muzaffar, S., et al., "A Pulsed-Data Technique for Single-channel, Dynamic Signaling for IoT Applications," International Conference on Very Large Scale Integration, Oct. 2017, Abu-Dhabi, IEEE, 6 pages.

Razavi, Behzad, "Design of High-Speed Circuits for Optical Communication Systems," Custom Integrated Circuits Conference, 2001, IEEE, pp. 315-322.

Soh, Lip-Kai, et al., "A 2.5-12.5Gbps Interpolator-Based Clock and Data Recovery Circuit for FPGA," Asia Symposium on Quality Electronic Design, Jul. 2012, IEEE, 4 pages.

Urano, Yuki, et al., "A 1.26mW/Gbps 8 Locking Cycles Versatile All-Digital CDR with TDC combined DLL," International Symposium on Circuits and Systems, May 2013, IEEE, pp. 1576-1579.

Widmer, A.X., et al., "A DC-Balanced, Partitioned-Block, 8B/10b Transmission Code," IBM Journal of Research and Development, vol. 27, Issue 5, Sep. 1983, 13 pages.

Svetlov, et al., "Self-Synchronized Encoding and Decoding Algorithms Based on Code Signal Feature," 2017 27th International Conference Radioelektronika (Radioelektronika), Apr. 19-20, 2017, Brno, Czech Republic, IEEE, 5 pages.

Non-Final Office Action for U.S. Appl. No. 16/023,356, dated Jun. 22, 2020, 17 pages.

Final Office Action for U.S. Appl. No. 16/023,356, dated Jan. 26, 2021, 22 pages.

* cited by examiner

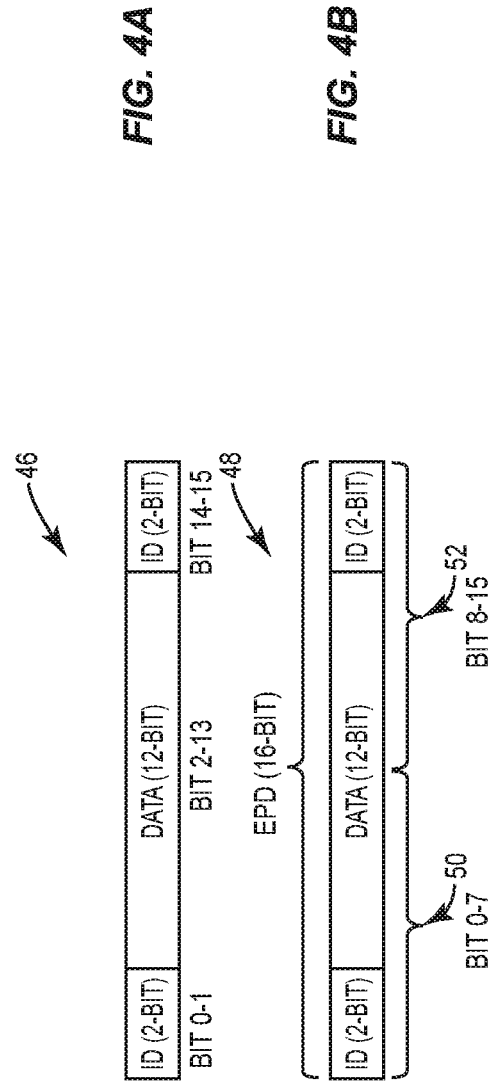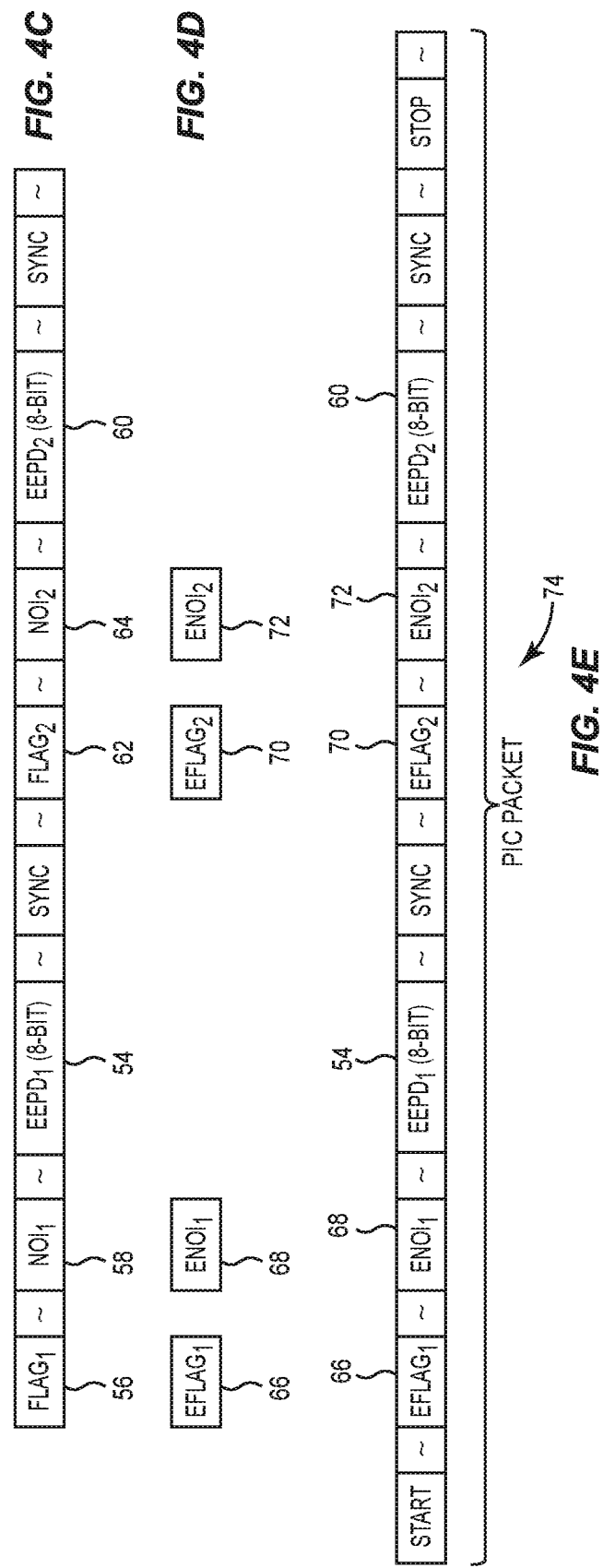

METHOD FOR SECURE DEVICE-TO-DEVICE COMMUNICATION USING MULTILAYERED CYPHERS

FIELD OF THE DISCLOSURE

The technology of the disclosure relates generally to secure device-to-device communication in an Internet-of-Things (IoT) network.

BACKGROUND

The Internet of Things (IoT) is expected to offer advanced machine-to-machine connectivity among devices, sensors, and systems. Low-end gadgets are expected to be ubiquitous and would constitute a larger percentage of nodes in an IoT network. These low-end nodes may include small microcontrollers and processors with very low power consumption, appropriate data rates, small foot print and reliable communication links. To preserve data confidentiality, integrity, and authenticity in the IoT network, the low-end nodes, sensors, and actuators should only interact with authorized devices and/or users.

Pulsed-index communication (PIC) is a low-power, single-channel protocol that can be adapted to support single-channel IoT communications without requiring clock and data recovery (CDR). PIC may achieve higher date rates, lower power consumption, and smaller footprints as compared to other available single-channel protocols. In this regard, the PIC protocol can be adapted to support a variety of IoT use cases, including building instrumentation, wearable healthcare, and urban monitoring.

Notably, the single-channel communications enabled by the PIC protocol need to be secured to preserve data authenticity and integrity in the IoT network. Although there has been a significant amount of development in the field of light-weight IoT cryptography (e.g., both symmetric and public key techniques), many of the light-weight symmetric key block ciphers are not well suited for single-channel communications in the IoT network due to hardware constraints and/or software overheads. As such, it may be desirable to extend the PIC protocol based on reliable and efficient encryption/decryption mechanisms to support secure single-channel communication in the IOT network.

SUMMARY

Embodiments of the disclosure relate to a method for secure device-to-device communication using multilayered ciphers. A selected cipher is employed to generate a pair of encryption/decryption keystreams for enabling multilayered encryption/decryption on a pulsed-index communication (PIC) packet(s). In examples discussed herein, a first layer encryption/decryption is performed by encrypting/decrypting a PIC data(s) (PD(s)) in the PIC packet(s) based on a first of the pair of encryption/decryption keystreams. In addition, a second layer encryption/decryption is performed by encrypting/decrypting selected control information (e.g., information related to encoding/decoding the PD(s)) in the PIC packet(s) based on a second of the pair of encryption/decryption keystreams. By performing multilayered encryption/decryption on the PIC packet(s), it is possible to defend against malicious attacks in single-channel device-to-device communication without compromising such key performance indicators (KPIs) as complexity, latency, power consumption, and footprint.

In one aspect, a method for secure device-to-device communication is provided. The method includes generating a first encryption/decryption keystream and at least one second encryption/decryption keystream based on a selected cipher. The method also includes generating a PIC data including a first number of data bits and a second number of identification bits. The method also includes encrypting the PIC data based on the first encryption/decryption keystream to generate an encrypted PIC data (EPD). The method also includes encoding the EPD to generate at least one encoded and encrypted PIC data (EEPD) in association with at least one flag and at least one number-of-indices (NOI). The method also includes encrypting the at least one flag and the at least one NOI based on the at least one second encryption/decryption keystream to generate at least one encrypted flag (EFLAG) and at least one encrypted NOI (ENOI), respectively. The method also includes constructing a PIC packet comprising the at least one EFLAG, the at least one ENOI, and the at least one EEPD. The method also includes transmitting the PIC packet.

In another aspect, a non-transitory computer-readable medium (CRM) is provided. The non-transitory CRM includes software with instructions configured to generate a first encryption/decryption keystream and at least one second encryption/decryption keystream based on a selected cipher. The non-transitory CRM also includes software with instructions configured to generate a PIC data including a first number of data bits and a second number of identification bits. The non-transitory CRM also includes software with instructions configured to encrypt the PIC data based on the first encryption/decryption keystream to generate an EPD. The non-transitory CRM also includes software with instructions configured to encode the EPD to generate at least one EEPD in association with at least one flag and at least one NOI. The non-transitory CRM also includes software with instructions configured to encrypt the at least one flag and the at least one NOI based on the at least one second encryption/decryption keystream to generate at least one EFLAG and at least one ENOI, respectively. The non-transitory CRM also includes software with instructions configured to construct a PIC packet comprising the at least one EFLAG, the at least one ENOI, and the at least one EEPD. The non-transitory CRM also includes software with instructions configured to transmit the PIC packet.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 4A-4E are schematic diagrams providing an exemplary illustration of using the process of FIG. 3 to enable multilayered protection for a 16-bit PIC data;

DETAILED DESCRIPTION

Figure 1:
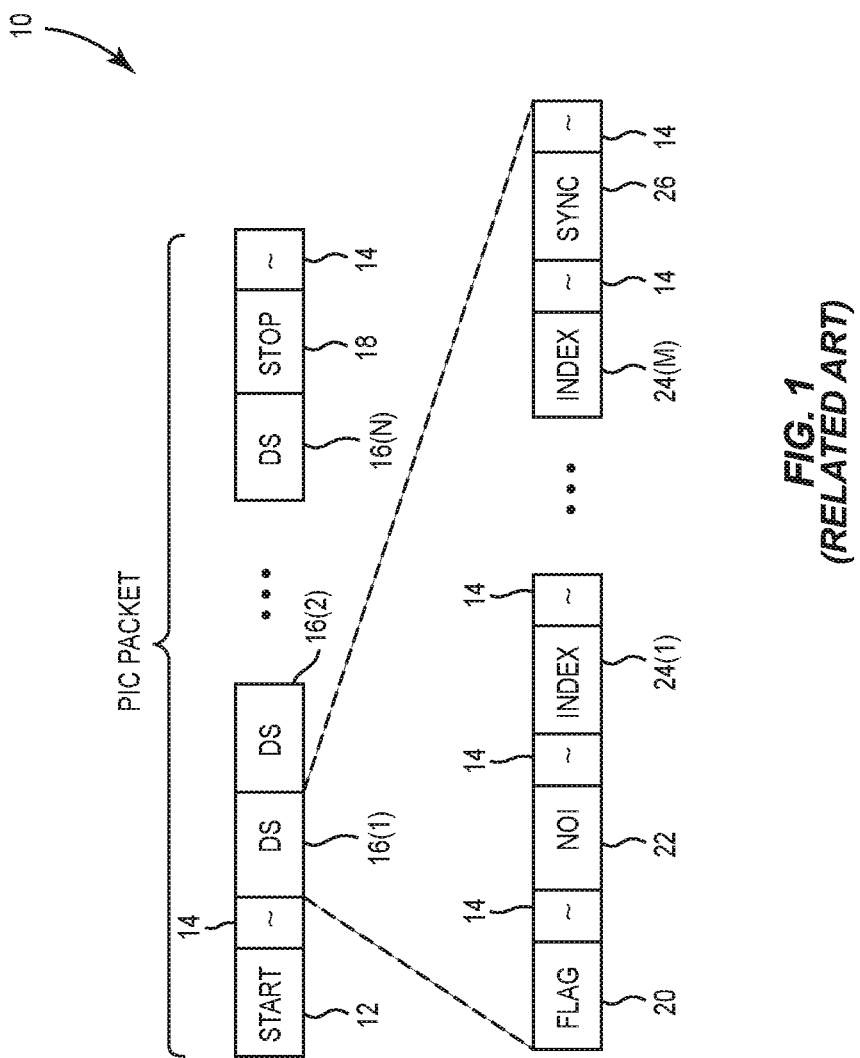
FIG. 1 is a schematic diagram providing an exemplary illustration of a pulsed-index communication (PIC) packet.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a method for secure device-to-device communication using multilayered ciphers. A selected cipher is employed to generate a pair of encryption/decryption keystreams for enabling multilayered encryption/decryption on a pulsed-index communication (PIC) packet(s). In examples discussed herein, a first layer encryption/decryption is performed by encrypting/decrypting a PIC data(s) (PD(s)) in the PIC packet(s) based on a first of the pair of encryption/decryption keystreams. In addition, a second layer encryption/decryption is performed by encrypting/decrypting selected control information (e.g., information related to encoding/decoding the PD(s)) in the PIC packet(s) based on a second of the pair of encryption/decryption keystreams. By performing multilayered encryption/decryption on the PIC packet(s), it is possible to defend against malicious attacks in single-channel device-to-device communication without compromising such key performance indicators (KPIs) as complexity, latency, power consumption, and footprint.

Figure 2:
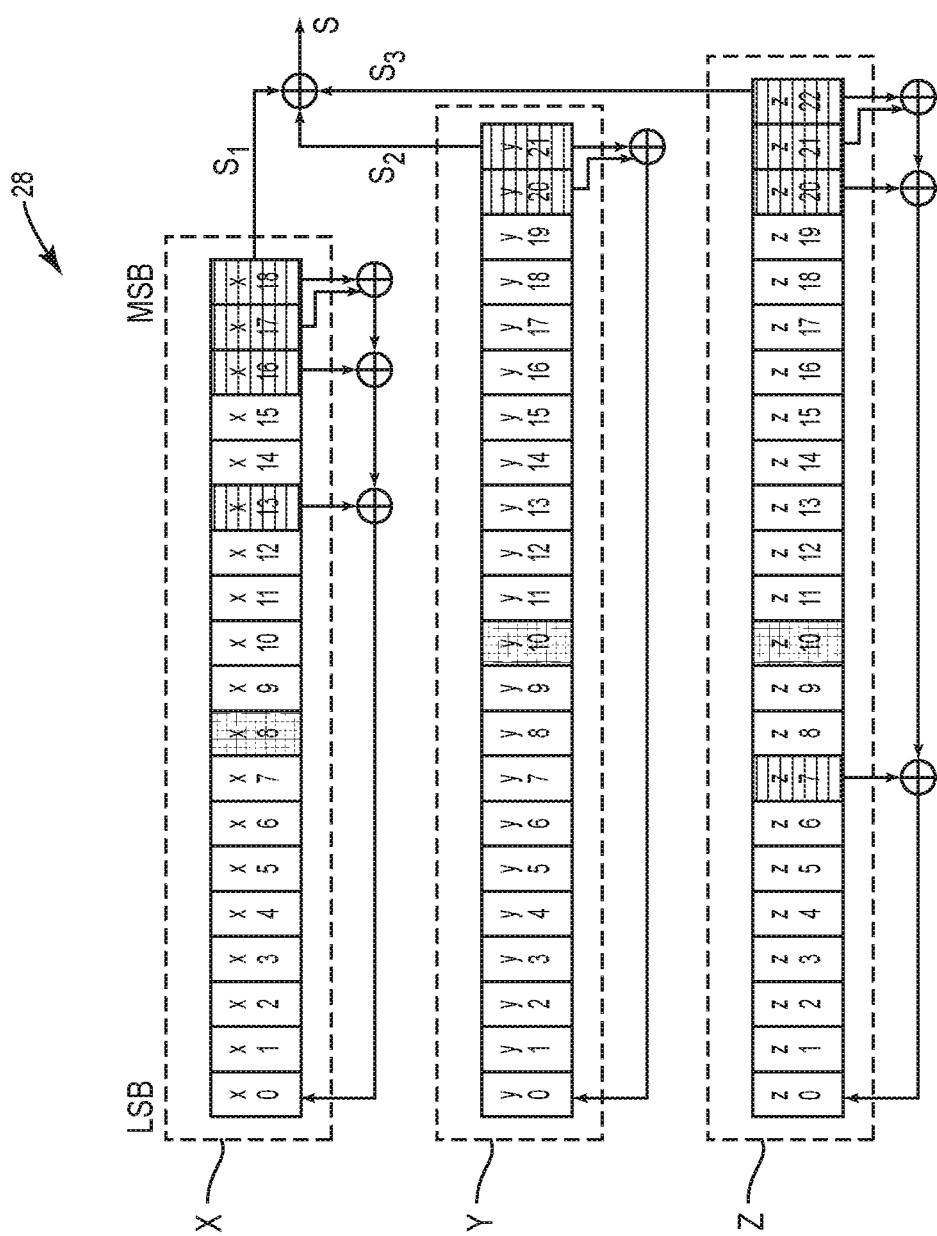
FIG. 2 is a schematic diagram providing an exemplary illustration of operational principles of a conventional A5/1 cipher.

Before discussing the method for secure device-to-device communication using multilayered ciphers, a brief overview of PIC packet format and A5/1 cipher is first provided with references to FIGS. 1 and 2, respectively. The discussion of specific exemplary aspects of the method for secure device-to-device communication using multilayered ciphers starts below with reference to FIG. 3.

In this regard, FIG. 1 is a schematic diagram providing an exemplary illustration of a PIC packet 10. The PIC packet 10 includes a start field 12, which may include two consecutive pulses. The start field 12 is followed by an inter-symbol delay 14, which may be equal to a number of clock cycles. The PIC packet 10 includes a number of data segments (DSs) 16(1)-16(N), followed by a stop field 18 and the inter-symbol delay 14.

Each of the DSs 16(1)-16(N) includes a flag field 20, a number-of-indices (NOI) field 22, a number of index fields 24(1)-24(M), and a sync field 26 that are separated by the inter-symbol delay 14. Each of the index fields 24(1)-24(M) indicates a respective ON bit (e.g., binary "1") in a respective DS among the DSs 16(1)-16(N).

PIC is a single-channel protocol that does not require any circuitry for clock and data recovery (CDR). The PIC protocol is based on the concept of a pulsed index where instead of transmitting the bits themselves, only the indices of the ON bits in each of the DSs 16(1)-16(N) are transmitted. The indices are encoded as pulse counts. The core of the PIC protocol is to encode the indices so as to minimize the number of ON bits. The encoding process includes a segmentation step where a PIC data is broken into a number of independent DSs (e.g., each with equal number of bits).

To maximize data rate and PIC uses on each of the DSs 16(1)-16(N), an encoding combination of bit inversion and/or segment reversion/flipping may be performed. The encoding combination is meant to reduce the number of ON bits and decrease index values corresponding to the ON bits so as to lower the number of pulses required to transmit the ON bits. To facilitate decoding, the flag field 20 in each of the DSs 16(1)-16(N) is configured to include flag pulses representing the type of encoding performed for the DS. For example, the flag field 20 can be encoded with 1-pulse, 2-pulse, 3-pulse, or 4-pulse to indicate inversion, reversal, inversion and reversal, or no inversion and no reversal, respectively. The NOI field 22 in each of the DSs 16(1)-16(N) is configured to indicate a count of the index fields 24(1)-24(M) in the respective DS. For example, the NOI field 22 is encoded with four consecutive pulses when the DS includes four index fields 24(1)-24(4) (M=4). In this regard, the flag field 20 and the NOI field 22 contain such control information critical to encoding/decoding each of the DSs 16(1)-16(N). In other words, it may be impossible to decode a DS in the PIC packet 10 if the flag field 20 and the NOI field 22 associated with the DS are compromised. As such, it may be desirable to protect the flag field 20 and the NOI field 22 in addition to protecting the index fields 24(1)-24(M).

Notably, all the fields in the PIC packet 10, including the flag field 20, the NOI field 22, and the index fields 24(1)-24(M), are transmitted in the form of a pulse stream. Each pulse in the pulse stream may be characterized by pulse width. In a non-limiting example, the pulse width corresponds to a number of clock cycles during which the pulse remains high. For further details regarding the PIC packet 10 and the PIC protocol, please refer to U.S. Patent Application Publication Number US 2018/0131505 A1.

FIG. 2 is a schematic diagram 28 providing an exemplary illustration of operational principles of a conventional A5/1 cipher. The conventional A5/1 cipher is based on a 64-bit secret key, which is stored in a first register X, a second register Y, and a third register Z. The first register X stores the first 19 of the 64-bit secret key (bits 0-18 of the 64-bit secret key) that are labeled as $X_0$-$X_{18}$, wherein $X_0$ and $X_{18}$ correspond respectively to a least significant bit (LSB) and a most significant bit (MSB) of the first register X. The second register Y stores the next 22 of the 64-bit secret key (bits 19-40 of the 64-bit secret key) that are labeled as $Y_0$-$Y_{21}$, wherein $Y_0$ and $X_{21}$ correspond respectively to an LSB and an MSB of the second register Y. The third register Z stores the last 23 of the 64-bit secret key (bits 41-63 of the 64-bit secret key) that are labeled as $Z_0$-$Z_{22}$, wherein $Z_0$ and $Z_{22}$ correspond respectively to an LSB and an MSB of the third register Z.

A majority function m=MAJ($X_8$, $Y_{10}$, $Z_{10}$) determines whether contents in each of the first register X, the second register Y, and the third register Z need to be right shifted. The register X is right shifted from the LSB $X_0$ toward the MSB $X_{18}$ by 1 bit if m=$X_8$. Likewise, the register Y is right shifted from the LSB $Y_0$ toward the MSB $Y_{21}$ by 1 bit if m=$Y_{10}$ and the register Z is right shifted from the LSB $Z_0$ toward the MSB $Z_{22}$ by 1 bit if m=$Z_{10}$.

The LSB $X_0$, the LSB $Y_0$, and the LSB $Z_0$ are then respectively replaced by values $t_X$, $t_Y$, and $t_Z$, which are determined based on the equations (Eq. 1-3) below.

$$t_X = X_{13} \oplus X_{16} \oplus X_{17} X_{18} \tag{Eq. 1}$$

$$t_Y = Y_{20} \oplus Y_{21} \tag{Eq. 2}$$

$$t_Z = Z_7 \oplus Z_{20} \oplus Z_{21} \oplus Z_{22} \tag{Eq. 3}$$

After each right shift in the first register X, the second register Y, or the third register Z, a final bit s is generated based on the equation (Eq. 4) below.

$$s = X_{18} \oplus Y_{21} \oplus Z_{22} \tag{Eq. 4}$$

The final bit s is then XORed with a data bit $d_i$ to generate one encrypted cipher text bit $c_j$ (e.g., $c_j = d_i \oplus s$). In this regard, to produce a specific number of encrypted cipher text bits (e.g., 16), an equal number of the final bit s must be produced. Thus, the above process needs to be repeated for same number of times (e.g., 16).

Notably, a naive implementation of the conventional A5/1 cipher may require at least one clock cycle to produce the final bit s. As a result, it would take at least the specific number of clock cycles (e.g., 16) to produce the specific number of encrypted cipher text bits (e.g., 16). In this regard, the cryptographic clock cycles may lead to reduced PIC data rates and increased power-on latency.

Although it may be possible to generate the specific number of encrypted cipher text bits (e.g., 16) in as few clock cycles as one cycle including the specific number of A5/1 blocks (e.g., 16), such hardware parallelism may have several potential drawbacks. For example, it may not be possible to use the same 64-bit secret key for all the A5/1 blocks. In addition, the multiple A5/1 blocks may lead to increased demand for silicon area and/or resources. In this regard, it may be desirable to protect the flag field 20 and the NOI field 22 in addition to protecting the index fields 24(1)-24(M) of FIG. 1, without increasing the latency, footprint, and/or resource demand.

Figure 3:
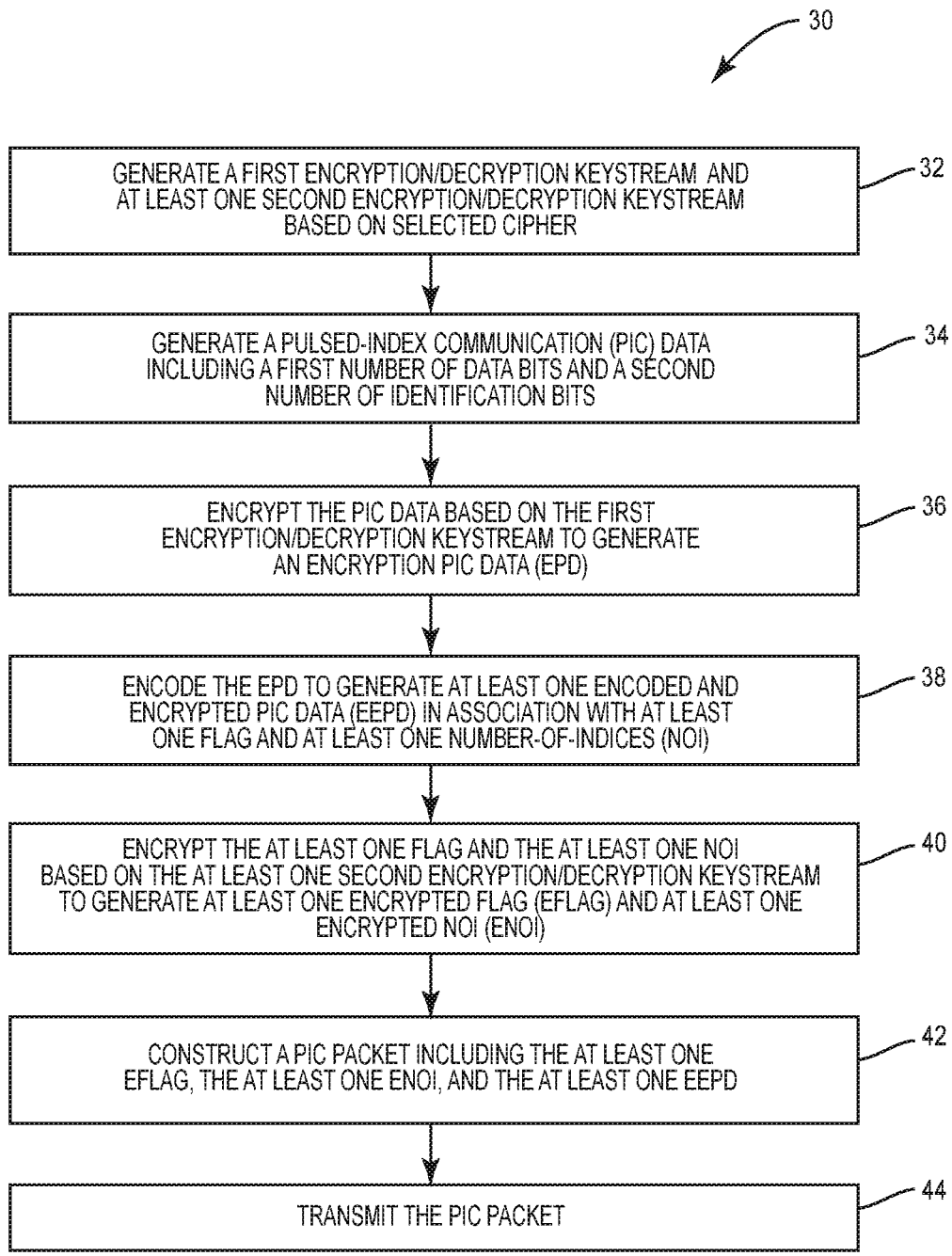
FIG. 3 is a flowchart of an exemplary process for enabling secure device-to-device communication in a transmitting device using multilayered ciphers according to an embodiment of the present disclosure.

In this regard, FIG. 3 is a flowchart of an exemplary process 30 for enabling secure device-to-device communication in a transmitting device using multilayered ciphers according to an embodiment of the present disclosure. The process 30 can generate a number of encryption/decryption keystreams for enabling multilayered encryption/decryption of a PIC packet. More importantly, the process 30 can produce the encryption/decryption keystreams within a single clock cycle without requiring hardware parallelism. As discussed in detail below, the process 30 can effectively and concurrently enable data encryption, packet encryption, and device authentication for device-to-device communication over a single-channel communication medium. As such, the process 30 can be employed in a communication device to support secure device-to-device communication in a wireless communication network such as an Internet-of-Things (IoT) network, without compromising such KPIs as complexity, latency, power consumption, and footprint of the communication device.

According to the process 30, a selected cipher is employed to generate a first encryption/decryption keystream $S_1$ and at least one second encryption/decryption keystream $S_2$ (block 32). A PIC data is generated with a first number of data bits and a second number of identification bits (block 34). The PIC data may be generated concurrently with or independently from generation of the first encryption/decryption keystream $S_1$ and the second encryption/decryption keystream $S_2$. The PIC data is then encrypted based on the first encryption/decryption keystream $S_1$ to generate an encrypted PIC data (EPD) to provide a first layer of data encryption on the PIC data (block 36). The EPD is then encoded to generate at least one encoded and encrypted PIC data (EEPD) in association with at least one flag and at least one NOI (block 38). To provide a second layer packet encryption, the flag and the NOI are encrypted based on the second encryption/decryption keystream $S_2$ to generate at least one encrypted flag (EFLAG) and at least one encrypted NOI (ENOI), respectively (block 40). Subsequently, a PIC packet is constructed to include the EFLAG, the ENOI, and the EEPD (block 42). Finally, the PIC circuit is then transmitted (e.g., via a single channel communication medium) (block 44). It should be noted that the flag and the NOI are used to construct the PIC circuit, but not transmitted in the PIC packet. Instead, the EFLAG and the ENOI are transmitted in places of the flag and the NOI, respectively, in the PIC packet.

The process 30 may be further illustrated based on a specific working example. In this regard, FIGS. 4A-4E are schematic diagrams providing an exemplary illustration of using the process 30 of FIG. 3 to enable multilayered protection for a 16-bit PIC data 46. It should be appreciated that the 16-bit PIC data 46 is merely a non-limiting example and the process 30 can be used to enable multilayered protection for PIC data of any size.

With reference to FIG. 4A, the 16-bit PIC data 46 includes 12 data bits (the first number of data bits) and 4 identification bits (the second number of identification bits). In a non-limiting example, bits 0-1 and bits 14-15 of the 16-bit PIC data each contain 2 of the 4 identification bits.

With reference to FIG. 4B, the 16-bit PIC data 46 is first encrypted based on the first encryption/decryption keystream $S_1$ to generate a 16-bit encrypted PIC data (EPD) 48. In this regard, the first encryption/decryption keystream $S_1$ provides data encryption (also referred to as "first layer protection") on the 16-bit PIC data 46. In a non-limiting example, the 16-bit EPD 48 is divided into a first 8-bit data segment 50 (bits 0-7) and a second 8-bit data segment 52 (bits 8-15) before being encoded by a PIC encoder based on the PIC protocol.

With reference to FIG. 4C, the first 8-bit data segment 50 is encoded based on the PIC protocol to generate a first encoded and encrypted PIC data (EEPD) 54 in association with a first flag 56 and a first NOI 58. The second 8-bit data segment 52 is encoded based on the PIC protocol to generate a second EEPD 60 in association with a second flag 62 and a second NOI 64. As previously discussed in FIG. 1, the first flag 56, the first NOI 58, the second flag 62, and the second NOI 64 include control information that is critical to encoding/decoding of the first EEPD 54 and the second EEPD 60. As such, it is necessary to further protect the first flag 56, the first NOI 58, the second flag 62, and the second NOI 64 through packet encryption (also referred to as "second layer protection").

The packet encryption exploits PIC's feature of transmitting the index numbers in the form of pulse streams. The first NOI 58 and the second NOI 64 are transmitted prior to transmitting the first EEPD 54 and the second EEPD 60, respectively. Accordingly, a receiver can use the first NOI 58 and the second NOI 64 to identify a pulse stream in the first EEPD 54 and the second EEPD 60. If any of the first NOI 58 and the second NOI 64 is destroyed, the receiver would not be able to decode the first EEPD 54 and/or the second EEPD 60 correctly due to a mismatch between an expected number of pulse streams and a count of pulse streams indicated by the destroyed NOI. In addition, the first flag 56 and the second flag 62 are also transmitted prior to transmission of the first EEPD 54 and the second EEPD 60, respectively. In this regard, if any of the first flag 56 and the second flag 62 is destroyed, the receiver would not be able to decode pulse streams in the first EEPD 54 and/or the second EEPD 60 to extract the 16-bit PIC data 46.

With reference to FIG. 4D, the first flag 56, the first NOI 58, the second flag 62, and the second NOI 64 are encrypted based on the second encryption/decryption keystream $S_2$ to generate a first encrypted flag (EFLAG) 66, a first encrypted NOI (ENOI) 68, a second EFLAG 70, and a second ENOI 72, respectively.

With reference to FIG. 4E, a PIC packet 74 is constructed to include the first EFLAG 66, the first ENOI 68, the first EEPD 54, the second EFLAG 70, the second ENOI 72, and the second EEPD 60 before being transmitted over a signal-channel communication medium. Notably, in the PIC packet 74, the first flag 56, the first NOI 58, the second flag 62, and the second NOI 64 of FIG. 4C are replaced by the first EFLAG 66, the first ENOI 68, the second EFLAG 70, and the second ENOI 72 of FIG. 4D, respectively. In other words, the first flag 56, the first NOI 58, the second flag 62, and the second NOI 64 are not transmitted as part of the PIC packet 74.

Thus, by transmitting the first EFLAG 66, the first ENOI 68, the second EFLAG 70, and the second ENOI 72 in the PIC packet 74, the first flag 56, the first NOI 58, the second flag 62, and the second NOI 64 are "intentionally destroyed" in the PIC packet 74. As a result, it may hinder an attacker's ability to correctly decode the first EEPD 54 and the second EEPD 60, even in case the attacker can sniff the PIC packet 74 and somehow crack the first encryption/decryption keystream $S_1$. In this regard, the packet encryption can provide further protection for the PIC packet 74.

Figure 5:
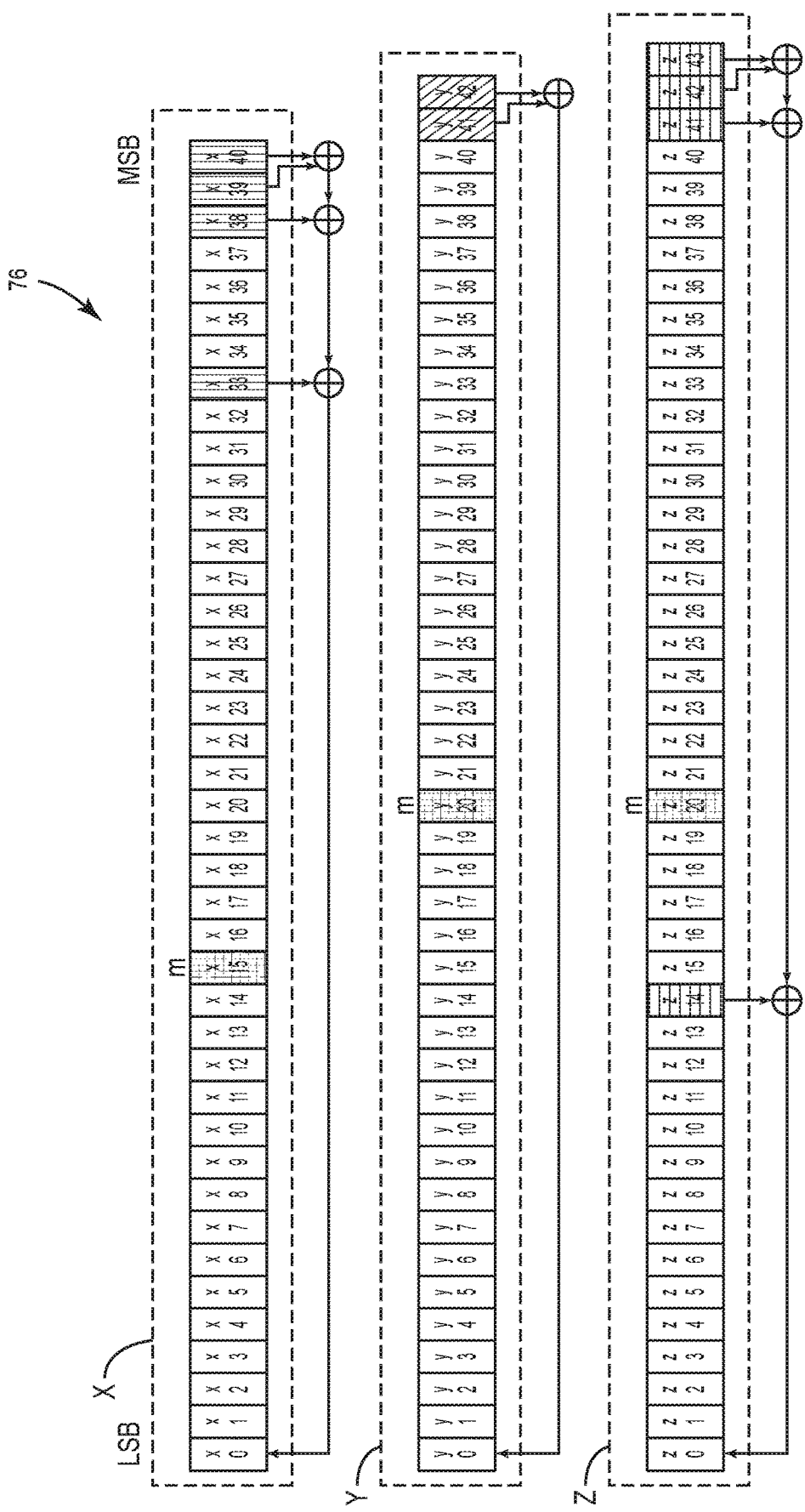
FIG. 5 is a schematic diagram providing an exemplary illustration of operational principles of a modified A5/1 cipher that is capable of generating a number of encryption/decryption keystreams within a single clock cycle.

Notably, the selected cipher can be any lightweight cipher with reasonable computational overheads. In a non-limiting example, the selected cipher can be a modified A5/1 cipher, which is created by modifying the conventional A5/1 cipher of FIG. 2. In this regard, FIG. 5 is a schematic diagram 76 providing an exemplary illustration of operational principles of a modified A5/1 cipher that is capable of generating a number of encryption/decryption keystreams within a single clock cycle. Elements of FIGS. 4A-4E are referenced in conjunction with FIG. 5 and will not be re-described herein.

The modified A5/1 cipher is based on a 128-bit secret key, which is stored in a first register X, a second register Y, and a third register Z. The first register X stores the first 41 of the 128-bit secret key (bits 0-40 of the 128-bit secret key) that are labeled as $X_0$-$X_{40}$, wherein $X_0$ and $X_{40}$ correspond respectively to an LSB and an MSB of the first register X. The second register Y stores the next 43 of the 128-bit secret key (bits 41-83 of the 128-bit secret key) that are labeled as $Y_0$-$Y_{42}$, wherein $Y_0$ and $X_{42}$ correspond respectively to an LSB and an MSB of the second register Y. The third register Z stores the last 44 of the 128-bit secret key (bits 84-127 of the 128-bit secret key) that are labeled as $Z_0$-$Z_{43}$, wherein $Z_0$ and $Z_{43}$ correspond respectively to an LSB and an MSB of the third register Z.

A majority function $m=MAJ(X_{15}, Y_{20}, Z_{20})$ determines whether contents in each of the first register X, the second register Y, and the third register Z need to be right shifted. The register X is right shifted from the LSB $X_0$ toward the MSB $X_{40}$ by 1 bit if $m=X_{15}$. Likewise, the register Y is right shifted from the LSB $Y_0$ toward the MSB $Y_{42}$ by 1 bit if $m=Y_{20}$ and the register Z is right shifted from the LSB $Z_0$ toward the MSB $Z_{43}$ by 1 bit if $m=Z_{20}$.

In contrast to the conventional A5/1 of FIG. 2, which would require multiple iterations of right shifts to generate an encryption/decryption keystream for encrypting an equal number of data bits, the modified A5/2 cipher only requires one iteration of right shift to generate the first encryption/decryption keystream $S_1$ and the second encryption/decryption keystream $S_2$. Given that it typically takes a single clock cycle to complete an iteration of right shift, the modified A5/1 can thus generate the first encryption/decryption keystream $S_1$ and the second encryption/decryption keystream $S_2$ within a single clock cycle.

The modified A5/1 cipher may generate the first encryption/decryption keystream $S_1$ with a length of N-bit based on equation (Eq. 5) below.

$$S_{1[i]} = X_{[iX]} \oplus Y_{[iY]} \oplus Z_{[iZ]} (0 \leq i \leq N-1) \quad \text{(Eq. 5)}$$

In this regard, to generate a 16-bit first encryption/decryption keystream S1 for encrypting the 16-bit PIC data 46, the modified A5/1 cipher can be configured to generate bits $S_{1[i]}$ ($0 \leq i \leq 15$) of the 16-bit first encryption/decryption keystream $S_1$ based the $X_{[iX]}$, $Y_{[iY]}$, and $Z_{[iZ]}$ ($0 \leq i \leq 15$) values as defined in Table 1 on the following page.

TABLE 1

| i | $i_X$ | $i_Y$ | $i_Z$ |
|---|-------|-------|-------|
| 0 | 5 | 35 | 3 |
| 1 | 38 | 27 | 13 |
| 2 | 28 | 10 | 23 |
| 3 | 8 | 17 | 12 |
| 4 | 17 | 39 | 29 |
| 5 | 25 | 33 | 24 |
| 6 | 12 | 3 | 7 |
| 7 | 14 | 23 | 33 |
| 8 | 11 | 37 | 32 |
| 9 | 32 | 20 | 39 |
| 10 | 2 | 11 | 28 |
| 11 | 18 | 36 | 34 |
| 12 | 19 | 16 | 18 |
| 13 | 13 | 25 | 11 |
| 14 | 30 | 2 | 20 |
| 15 | 10 | 22 | 5 |

For example, the bits $X_5$, $Y_{35}$, and $Z_3$ are XORed to generate bit 0 of the 16-bit first encryption/decryption keystream $S_1$, the bits $X_{38}$, $Y_{27}$, and $Z_{13}$ are XORed to generate bit 1 of the 16-bit first encryption/decryption keystream $S_1$, and so on. Given that the XOR operation can be performed substantially concurrently, the modified A5/1 cipher may be capable of generating all 16 bits of the first encryption/decryption keystream $S_1$ substantially concurrently. Notably, the first encryption/decryption keystream $S_1$ may be updated after each transmission and/or reception of a PIC data (e.g., the 16-bit PIC data 46).

In addition to generating the 16-bit first encryption/decryption keystream $S_1$ for providing the data encryption, the modified A5/1 cipher can generate the second encryption/decryption keystream $S_2$ for enabling the packet encryption. In a non-limiting example, the modified A5/1 cipher can generate the first encryption/decryption keystream $S_1$ and the second encryption/decryption keystream $S_2$ substantially concurrently within a single clock cycle. Although the modified A5/1 cipher may not generate the first encryption/decryption keystream $S_1$ and the second encryption/decryption keystream $S_2$ at an exact same time, the modified A5/1 cipher is able to generate both the first encryption/decryption keystream $S_1$ and the second encryption/decryption keystream $S_2$ within a single clock cycle.

Notably, the conventional A5/1 of FIG. 2 may cause an encryption/decryption keystream to eventually repeat, albeit after a long time. Thus, it may be desirable to avoid repetition of the encryption/decryption keystream by introducing more randomness in an encryption/decryption keystream generation. In this regard, the modified A5/1 can be configured to swap one or more selected bits between the first register X, the second register Y, and the third register Z after transmitting or receiving each PIC data (e.g., the 16-bit PIC data 46). In a non-limiting example, if the bit 8 in an immediate preceding PIC data is ON (e.g., binary "1"), the first register X, the second register Y, and the third register Z can be swapped based on the equation (Eq. 6) below.

$$X[1:40] = Y[1:40]$$

$$Y[1:40] = Z[1:40]$$

$$Z[1:40] = X[1:40] \quad \text{(Eq. 6)}$$

As shown in the equation (Eq. 6) above, bits $X_1$-$X_{40}$ of the first register X are swapped with bits $Y_1$-$Y_{40}$ of the second register Y, bits $Y_1$-$Y_{40}$ of the second register Y are swapped with bits $Z_1$-$Z_{40}$ of the third register Z, and bits $Z_1$-$Z_{40}$ of the third register Z are swapped with bits $X_1$-$X_{40}$ of the first register X. It should be noted that bits $X_0$, $Y_0$, and $Z_0$ are never swapped.

According to the previous discussions in FIGS. 4A-4E, the second encryption/decryption keystream $S_2$ is used to encrypt the first flag 56, the first NOI 58, the second flag 62, and the second NOI 64 to provide the packet encryption for the PIC packet 74. In this regard, in a non-limiting example, the second encryption/decryption keystream $S_2$ is so generated to include a first NOI encryption/decryption key $N_{num1}$, a first flag encryption/decryption key $N_{num2}$, a second NOI encryption/decryption key $N_{num3}$, and a second flag encryption/decryption key $N_{num4}$. Each of the first NOI encryption/decryption key $N_{num1}$, the first flag encryption/decryption key $N_{num2}$, the second NOI encryption/decryption key $N_{num3}$, and the second flag encryption/decryption key $N_{num4}$ may be 4-bits long. At start, the first NOI encryption/decryption key $N_{num1}$, the first flag encryption/decryption key $N_{num2}$, the second NOI encryption/decryption key $N_{num3}$, and the second flag encryption/decryption key $N_{num4}$ may be initialized with random numbers or distributed evenly from 0 to 15. Subsequently, the modified A5/1 cipher can be configured to generate the first NOI encryption/decryption key $N_{num1}$, the first flag encryption/decryption key $N_{num2}$, the second NOI encryption/decryption key $N_{num3}$, and the second flag encryption/decryption key $N_{num4}$ based on equations (Eq. 7-Eq. 10) below.

$$N_{num1} = N_{num1} \oplus \{PData_5, Y_1, Z_{21}, X_{37}\} \quad \text{(Eq. 7)}$$

$$N_{num2} = N_{num2} \oplus \{PData_7, Y_7, Z_9, X_{31}\} \quad \text{(Eq. 8)}$$

$$N_{num3} = N_{num3} \oplus \{Y_{21}, Z_{39}, X_{11}, PData_5\} \quad \text{(Eq. 9)}$$

$$N_{num1} = N_{num1} \oplus \{Y_{13}, Z_{13}, X_{21}, PData_7\} \quad \text{(Eq. 10)}$$

In the equations (Eq. 7-Eq.10) above, $PData_5$ and $PData_7$ represent bits 5 and 7 of the immediate preceding PIC data (e.g., the 16-bit PIC data 46) being transmitted or received. The first NOI encryption/decryption key $N_{num1}$, the first flag encryption/decryption key $N_{num2}$, the second NOI encryption/decryption key $N_{num3}$, and the second flag encryption/decryption key $N_{num4}$ can be used to encrypt the first NOI 58 ("$NOI_1$"), the first flag 56 ("$Flag_1$"), the second NOI 64 ("$NOI_2$"), and the second flag 62 ("$Flag_2$") to generate the first ENOI 68 ("$ENOI_1$"), the first EFLAG 66 ("$EFLAG_1$"), the second ENOI 72 ("$ENOI_2$"), and the second EFLAG 70 ("$EFLAG_2$"), respectively. More specifically, the first NOI 58, the first flag 56, the second NOI 64, and the second flag 62 can be encrypted based on the equations (Eq. 11-Eq. 14) below.

$$ENOI_1 = N_{num1} \oplus NOI_1 \quad \text{(Eq. 11)}$$

$$EFLAG_1 = N_{num2} \oplus Flag_1 \quad \text{(Eq. 12)}$$

$$ENOI_2 = N_{num3} \oplus NOI_2 \quad \text{(Eq. 13)}$$

$$EFLAG_2 = N_{num4} \oplus Flag_2 \quad \text{(Eq. 14)}$$

Consider a man-in-the-middle attack where an attacker pretends to be a valid transmitter and tries to send false PIC packets to a receiver. Although it may be difficult for the attacker to generate a completely receivable PIC packet, there may a possibility that the attacker could succeed. For example, the attacker is attempting to desynchronize a receiver key generator to cause the receiver to reject packets from a valid transmitter due to a mismatch between transmitted and received encryption/decryption keystreams, such as the first encryption/decryption keystream $S_1$ and/or the second encryption/decryption keystream $S_2$. If the attacker succeeds in deceiving the receiver, the attacker may then hijack any equipment being controlled by the receiver. Thus, it may also be desirable to stop such man-in-the-middle attacks by implementing an authentication mechanism between a transmitter and a receiver.

In this regard, the 4 identification bits in the 16-bit PIC data 46 are configured to provide third layer protection for the PIC packet 74. In a non-limiting example, the modified A5/1 cipher can be configured to generate the 4 identification bits (referred to as "ID") in conjunction with the first encryption/decryption keystream $S_1$ and the second encryption/decryption keystream $S_2$. The ID may be initialized with a random number and subsequently generated based on the equation (Eq. 15) below.

$$ID = ID \oplus \{PData_3, Y_{29}, Z_{21}, X_9\} \quad \text{(Eq. 15)}$$

In the equation (Eq. 15) above, $PData_3$ represents bit 3 of an immediate preceding PIC data (e.g., the 16-bit PIC data 46) being transmitted or received. Accordingly, the 4 identification bits are also updated upon transmitting or receiving each PIC data.

Since the 16-bit encrypted PIC data (EPD) 48 is divided into the first 8-bit data segment 50 (bits 0-7) and the second 8-bit data segment 52 (bits 8-15) before being encoded, the ID is integrated in such a way that the first 8-bit data segment 50 and the second 8-bit data segment 52 each include 2 of the 4 identification bits that are distinct. As such, the 4 identification bits can only be recovered by the receiver after receiving both the first 8-bit data segment 50 and the second 8-bit data segment 52. By extracting and comparing the received ID at the receiver, it may be possible to perform an authentication check based on the 4 identification bits. If the authentication check fails, the receiver may discard the PIC packet 74 entirely.

Figure 6:
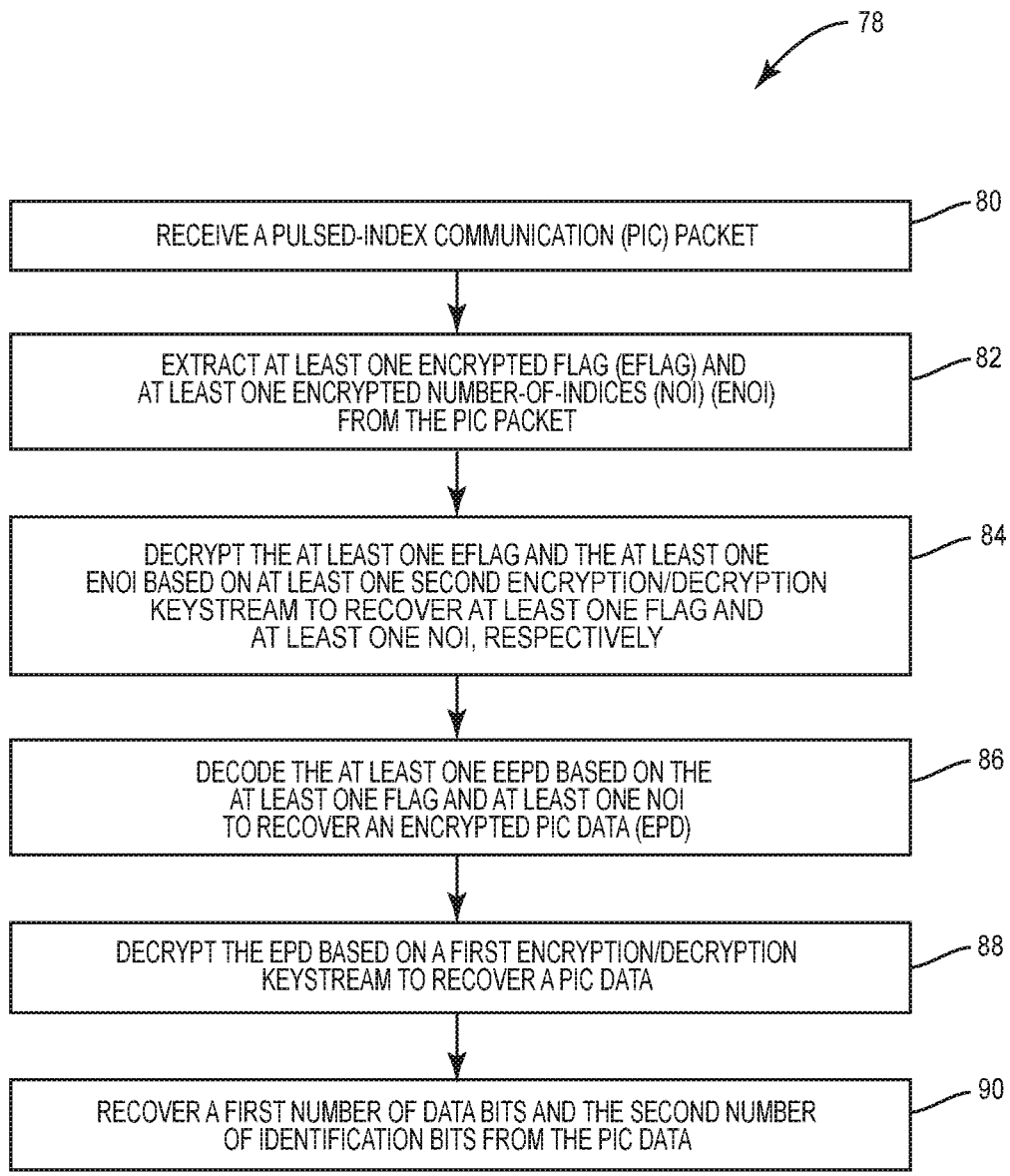
FIG. 6 is a flowchart of an exemplary process 78 for enabling secure device-to-device communication in a receiving device using multilayered ciphers.

FIG. 6 is a flowchart of an exemplary process 78 for enabling secure device-to-device communication in a receiving device using multilayered ciphers. The receiving device is configured to receive a PIC packet (e.g., the PIC packet 74) over the single-channel communication medium (block 80). Next, the receiving device extracts at least one EFLAG (e.g., the first EFLAG 66 and the second EFLAG 70) and at least one ENOI (e.g., the first ENOI 68 and the second ENOI 72) from the received PIC packet (block 82). The receiving device may employ the modified A5/1 cipher to generate the first encryption/decryption keystream $S_1$ and the second encryption/decryption keystream $S_2$ in a similar fashion as does the transmitting device. Accordingly, the receiving device decrypts the EFLAG and the ENOI based on the second encryption/decryption keystream $S_2$ to recover at least one flag and at least one NOI, respectively (block 84). Next, the receiving device decodes at least one EEPD (e.g., the first EEPD 54 and the second EEPD 60) based on the flag and the NOI to recover an EPD (e.g., the 16-bit EPD 48) (block 86). Subsequently, the receiving device decrypts the EPD based on the first encryption/decryption keystream $S1$ to recover a PIC data (e.g., the 16-bit PIC data 46) (block 88). Accordingly, the receiving device can recover a first number of data bits and a second number of identification bits (block 90).

Figure 7:
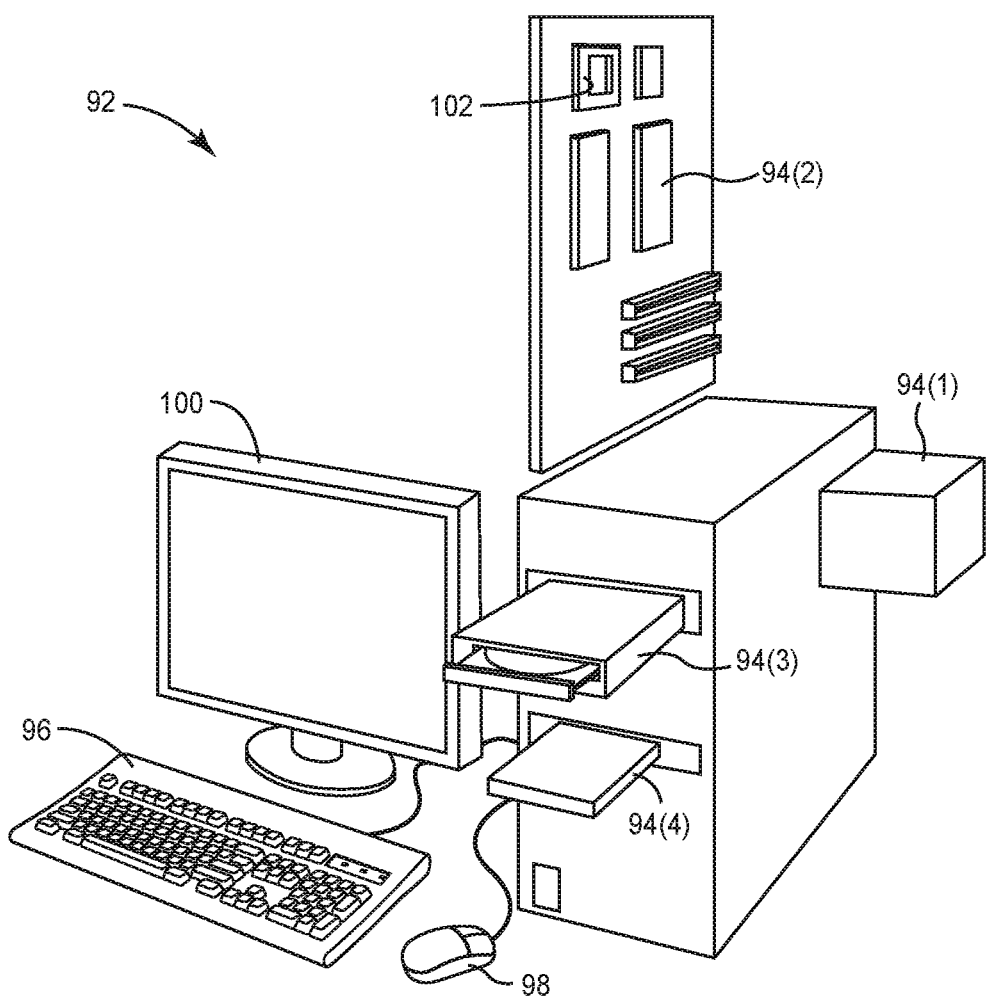
FIG. 7 is a schematic diagram of an exemplary computer system including one or more non-transitory computer-readable media for storing software instructions to implement the processes of FIGS. 3 and 6.

FIG. 7 is a schematic diagram of an exemplary computer system 92 including one or more non-transitory computer-readable media 94(1)-94(4) for storing software instructions to implement the process 30 of FIG. 3 and the process 78 of FIG. 6. The non-transitory computer-readable media 94(1)-94(4) further include a hard drive 94(1), an on-board memory system 94(2), a compact disc 94(3), and a floppy disk 94(4). Each of the non-transitory computer-readable media 94(1)-94(4) may be configured to store the software instructions to implement the process 30 and/or the process 78.

The computer system 92 also includes a keyboard 96 and a computer mouse 98 for inputting the software instructions onto the non-transitory computer-readable media 94(1)-94(4). The keyboard 96 and the computer mouse 98 may also be used to input the initial system parameter of the process 30 and/or the process 78, which can be used to support secure device-to-device communication according to the process 30 and/or the process 78. The computer system 92 also includes a monitor 100.

Further, the computer system 92 includes a processor 102, which can be an application-specific integrated circuit (ASIC), configured to read the software instructions from the non-transitory computer-readable media 94(1)-94(4) and execute the software instructions to implement the process 30 and/or the process 78. While the computer system 92 is illustrated as a single device, the computer system 92 may also be a computer network deployed according to a centralized topology or a distributed topology.

Those skilled in the art will recognize improvements and modifications to the preferred embodiments of the present disclosure. All such improvements and modifications are considered within the scope of the concepts disclosed herein and the claims that follow.

What is claimed is:

1. A method for secure device-to-device communication comprising:
   generating a first encryption/decryption keystream and at least one second encryption/decryption keystream based on a selected cipher;
   generating a pulsed-index communication (PIC) data comprising a first number of data bits and a second number of identification bits;
   encrypting the PIC data based on the first encryption/decryption keystream to generate an encrypted PIC data (EPD);
   encoding the EPD to generate at least one encoded and encrypted PIC data (EEPD) in association with at least one flag and at least one number-of-indices (NOI);
   encrypting the at least one flag and the at least one NOI based on the at least one second encryption/decryption keystream to generate at least one encrypted flag (EFLAG) and at least one encrypted NOI (ENOI), respectively;
   constructing a PIC packet comprising the at least one EFLAG, the at least one ENOI, and the at least one EEPD; and
   transmitting the PIC packet.

2. The method of claim 1 further comprising:
   generating the first encryption/decryption keystream, the at least one second encryption/decryption keystream, and the second number of identification bits within a single clock cycle; and transmitting the PIC packet over a single-channel communication medium.

3. The method of claim 1 further comprising generating concurrently the first encryption/decryption keystream, the at least one second encryption/decryption keystream, and the second number of identification bits based on a modified A5/1 cipher and a 128-bit secret key.

4. The method of claim 3 further comprising:
storing a first 41 of the 128-bit secret key in a first register;
storing a next 43 of the 128-bit secret key in a second register; and
storing a last 44 of the 128-bit secret key in a third register.

5. The method of claim 4 further comprising:
generating the first encryption/decryption keystream comprising a number of encryption/decryption bits corresponding respectively to the first number of data bits and the second number of identification bits; and
encrypting the first number of data bits and the second number of identification bits based on the number of encryption/decryption bits, respectively.

6. The method of claim 5 further comprising generating each of the number of encryption/decryption bits concurrently by performing a respective exclusive-OR (XOR) function between a respective first selected bit in the first register, a respective second selected bit in the second register, and a respective third selected bit in the third register.

7. The method of claim 4 further comprising:
generating the at least one second encryption/decryption keystream comprising at least one flag encryption/decryption key and at least one NOI encryption/decryption key; and
encrypting the at least one flag and the at least one NOI based on the at least one flag encryption/decryption key and the at least one NOI encryption/decryption key to generate the at least one EFLAG and the at least one ENOI, respectively.

8. The method of claim 4 further comprising swapping one or more selected bits between the first register, the second register, and the third register in response to transmitting or receiving a PIC data.

9. The method of claim 1 further comprising:
receiving the PIC packet;
extracting the at least one EFLAG and the at least one ENOI from the PIC packet;
decrypting the at least one EFLAG and the at least one ENOI based on the at least one second encryption/decryption keystream to recover the at least one flag and the at least one NOI, respectively;
decoding the at least one EEPD based on the at least one flag and the at least one NOI to recover the EPD;
decrypting the EPD based on the first encryption/decryption keystream to recover the PIC data; and
recovering the first number of data bits and the second number of identification bits from the PIC data.

10. The method of claim 9 further comprising performing an authentication check based on the second number of identification bits.

11. A non-transitory computer-readable medium (CRM) comprising software with instructions configured to:
generate a first encryption/decryption keystream and at least one second encryption/decryption keystream based on a selected cipher;
generate a pulsed-index communication (PIC) data comprising a first number of data bits and a second number of identification bits;
encrypt the PIC data based on the first encryption/decryption keystream to generate an encrypted PIC data (EPD);
encode the EPD to generate at least one encoded and encrypted PIC data (EEPD) in association with at least one flag and at least one number-of-indices (NOI);
encrypt the at least one flag and the at least one NOI based on the at least one second encryption/decryption keystream to generate at least one encrypted flag (EFLAG) and at least one encrypted NOI (ENOI), respectively;
construct a PIC packet comprising the at least one EFLAG, the at least one ENOI, and the at least one EEPD; and
transmit the PIC packet.

12. The non-transitory CRM of claim 11 wherein the software with instructions is further configured to:
generate the first encryption/decryption keystream, the at least one second encryption/decryption keystream, and the second number of identification bits within a single clock cycle; and
transmit the PIC packet over a single-channel communication medium.

13. The non-transitory CRM of claim 11 wherein the software with instructions is further configured to generate concurrently the first encryption/decryption keystream, the at least one second encryption/decryption keystream, and the second number of identification bits based on a modified A5/1 cipher and a 128-bit secret key.

14. The non-transitory CRM of claim 13 wherein the software with instructions is further configured to:
store a first 41 of the 128-bit secret key in a first register;
store a next 43 of the 128-bit secret key in a second register; and
store a last 44 of the 128-bit secret key in a third register.

15. The non-transitory CRM of claim 14 wherein the software with instructions is further configured to:
generate the first encryption/decryption keystream comprising a number of encryption/decryption bits corresponding respectively to the first number of data bits and the second number of identification bits; and
encrypt the first number of data bits and the second number of identification bits based on the number of encryption/decryption bits, respectively.

16. The non-transitory CRM of claim 15 wherein the software with instructions is further configured to generate each of the number of encryption/decryption bits concurrently by performing a respective exclusive-OR (XOR) function between a respective first selected bit in the first register, a respective second selected bit in the second register, and a respective third selected bit in the third register.

17. The non-transitory CRM of claim 14 wherein the software with instructions is further configured to:
generate the at least one second encryption/decryption keystream comprising at least one flag encryption/decryption key and at least one NOI encryption/decryption key; and
encrypt the at least one flag and the at least one NOI based on the at least one flag encryption/decryption key and the at least one NOI encryption/decryption key to generate the at least one EFLAG and the at least one ENOI, respectively.

18. The non-transitory CRM of claim 14 wherein the software with instructions is further configured to swap one or more selected bits between the first register, the second register, and the third register in response to transmitting or receiving a PIC data.

19. The non-transitory CRM of claim 11 wherein the software with instructions is further configured to:
receive the PIC packet;
extract the at least one EFLAG and the at least one ENOI from the PIC packet;
decrypt the at least one EFLAG and the at least one ENOI based on the at least one second encryption/decryption keystream to recover the at least one flag and the at least one NOI, respectively;
decode the at least one EEPD based on the at least one flag and the at least one NOI to recover the EPD;
decrypt the EPD based on the first encryption/decryption keystream to recover the PIC data; and
recover the first number of data bits and the second number of identification bits from the PIC data.

20. The non-transitory CRM of claim 19 wherein the software with instructions is further configured to perform an authentication check based on the second number of identification bits.

* * * * *